United States Patent [19]
Jöves et al.

[11] Patent Number: 5,811,161
[45] Date of Patent: Sep. 22, 1998

[54] PACKAGE OF PAPER OR PAPERBOARD HAVING A THIN EXTRUDED POLYETHYLENE COATING

[75] Inventors: Håkan Jöves; Johanna Löfroth Nickel; Bengt Nordin; Roland Nordin, all of Gävle, Sweden

[73] Assignee: Korsnas AB, Gavle, Sweden

[21] Appl. No.: 586,907

[22] PCT Filed: Jul. 26, 1994

[86] PCT No.: PCT/SE94/00714

§ 371 Date: Jul. 10, 1996

§ 102(e) Date: Jul. 10, 1996

[87] PCT Pub. No.: WO95/03980

PCT Pub. Date: Feb. 9, 1995

[30] Foreign Application Priority Data

Jul. 27, 1993 [SE] Sweden ................................. 9302513
Aug. 27, 1993 [SE] Sweden ................................. 9302773

[51] Int. Cl.⁶ .............................. B65D 30/02; B09B 3/00
[52] U.S. Cl. ..................... 428/34.3; 428/219; 428/336; 428/341; 428/513; 383/1; 383/113; 383/116; 241/4

[58] Field of Search ..................... 428/34.3, 219, 428/336, 341, 511, 535, 536, 513, 903.3; 383/1, 113, 116; 241/4

[56] References Cited

U.S. PATENT DOCUMENTS

| | | | |
|---|---|---|---|
| 4,242,418 | 12/1980 | Kitagawa | 428/507 |
| 5,178,469 | 1/1993 | Collison | 383/1 |
| 5,212,219 | 5/1993 | Griffin | 524/17 |
| 5,458,933 | 10/1995 | Suskind | 428/34.2 |

*Primary Examiner*—Rena L. Dye
*Attorney, Agent, or Firm*—Bacon & Thomas

[57] ABSTRACT

The present invention relates to a package of paper or paperboard having a thin extruded polyethylene coating, which is degradable in a compost. Further, the invention also relates to a method of disposing of such a package by placing the package, with or without compostable contents, in a compost, and use of such a package for storage and transport of compostable waste, such as domestic waste.

13 Claims, No Drawings

PACKAGE OF PAPER OR PAPERBOARD HAVING A THIN EXTRUDED POLYETHYLENE COATING

The present invention relates to a package of paper or paperboard having a thin extruded polyethylene coating, which is degradable in a compost. Further, the invention also relates to a method of disposing of such a package by placing the package, with or without compostable contents, in a compost, and use of such a package for storage and transport of compostable waste, such as domestic waste.

BACKGROUND

Lately environmental awareness has made the handling up to now of different types of wastes questionable. In order to manage different types of wastes in the best possible way the waste should be sorted with regard to the final disposal of the waste, e.g. with regard to whether it can be recirculated or not.

One way of disposing of waste is to compost it, in case it is degradable in a compost.

Recently, pre-sorting at the source of domestic waste has become more common. A large part of the domestic waste can be taken care of by composting, and therefore it is appropriate to gather together compostable waste already in the households for either composting in a domestic compost or transporting to a waste container for further transporting to e.g. municipal composting.

It would be convenient for i.a. restaurants, shops and households to assemble compostable waste in a package which, after it has been filled up, can be thrown into the compost together with its contents.

It is known that paper and paperboard are degraded in a functioning compost. Moreover, paper and paperboard constitute a source of carbon, which is necessary for obtaining a good composting result.

The problem of composting paper-containing packages has not been the paper but rather the coatings on the paper or the paperboard. Many new plastic materials have been developed for the purpose of constituting coatings on different packages, which will be possible to dispose of in a compost. For example, in WO 93/07198 is disclosed compostable new fiber and film-forming polyesters. There is also disclosed, in a comparative composting experiment with a non-woven sheet which had been coated with a 30.5$\mu$m (1.2 mil) polyethylene layer (corresponding to approximately 27 g/m$^2$), that the polyethylene layer remained intact (page 33, lines 4–8).

The inert, cheap plastic polyethylene has thus hitherto been considered to be impossible to compost, even as a coating on paper, due to its prolonged stability at environmental conditions.

DESCRIPTION OF THE INVENTION

Surprisingly it has now been found that a package of paper or paperboard having a thin extruded polyethylene coating is degradable in a compost.

How thin the extruded polyethylene coating must be to be degraded in a compost may vary depending on many factors, such as the method of manufacturing, the quality of the compost etc. The thickness of the polyethylene coating should however be less than 25 $\mu$m in order to be able to anticipate that the package is degraded in a compost.

Accordingly, the present invention provides a package of paper or paperboard having a thin extruded polyethylene coating which is degradable in a compost.

In one embodiment of the invention the polyethylene coating is perforated by the fibres of the paper or the paperboard. The perforation need not be extensive and/or regular, and so-called "pin holes" here and there in the material are considered to constitute the perforation.

In another embodiment of the invention the amount of polyethylene in the coating is approximately 5 g/m$^2$ of paper or paperboard.

In yet another embodiment of the invention the package of the invention is a bag for composting of compostable waste.

By the expression "degradable" is intended that the material is degraded, i.e. that it can undergo an irreversible process which leads to a significant change of the chemical and/or physical structure of the material, which is typically characterized by loss of properties (e.g. integrity, molecular weight or structure, mechanic strength) and/or fragmentation.

The paper or paperboard portion of the package may in principle be of any type of paper or paperboard, such as paper or paperboard which has been manufactured from bleached, partially bleached or unbleached paper pulp or recycled fibre.

The polyethylene shall be in a form suitable for extrudation on paper. In the composting experiments which are disclosed herein, the packages according to the invention are bags which are made of paper having an extruded polyethylene coating, which coating has been applied in accordance with the so-called "Capcote" method.

The invention also comprises a method of disposing of a package according to the invention by placing the package, with or without compostable contents, in a compost, and the use of a package according to the invention for storage and transport of compostable waste.

The package according to the invention may have any primary use. It may be directly intended for composting of compostable waste, such as a bag for composting or it may e.g. be a food or detergent package or a waste bag. Thereafter, it may optionally be used for storage and transport of compostable waste, such as domestic waste. The package may then be placed in a functioning compost, either with or without compostable contents, whereupon a biological degradation of the paper and a degradation or trituration of the polyethylene coating occurs. The degradation of the polyethylene coating has been established at composting experiments performed by Smedlund Miljösystem AB, Stenungsund, Sweden, whereby it was found that after finished composting in a rotating composting plant no traces of packages according to the invention in the form of bags for composting could be detected at visual inspection, and consequently there were no confluent flakes of the polyethylene coating. The invention will now be illustrated with the aid of composting experiments where bags are used as examples of packages according to the invention. The degradability of the bags during the composting process was examined.

DESCRIPTION OF THE COMPOSTING PROCESS AND THE COMPOST LABORATORY

The composting tests were performed in Smedlund's compost laboratory. The compost laboratory is partly automated and consists of a number of isolated cylinders with the capacity of approximately 130 liters. The size implies that the composting experiments are performed on an authentic scale, which means that the results which are obtained should correspond to those which are obtained by composting of the organic fraction, after pre-separation at source.

The compost cylinders are of dynamic type, which means that the compost material is mixed and airated as a result of slowly rotating the cylinders at regular intervals. The cylinders are tight and the airating occurs when air is aspirated via valves with the aid of a fan device.

In general, composting can be applied to solid and semi-solid material, such as night soil, sludge, farmyard manure, farming wastes and organic domestic waste. The composting occurs under aerobic conditions and the processes which take place are similar in many respects to the processes which co-operate with the natural degrading of dead organic material in the environment.

The aerobic processes which take place during composting are associated with the transformation of considerable amounts of energy, the excess of which is released in the form of heat, and therefore the growing microbial activity in the initial stage of composting is indicated by the rapidly rising temperature. The temperature is also the determining factor for the succession of micro-organisms during the different stages of the composting process.

The first ones to occur are mesophilic bacteria which together with mesophilic fungi and actinomycetes degrade large parts of the easily available, low molecular weight portions of the waste. Thereafter, with increase in temperature, thermophilic micro-organisms occur, and they degrade all parts of the organic substance.

In the final stage, when the temperature decreases with declined microbial activity, some types of actinomycetes begin to dominate. It is in the final stage that some fungi and actinomycetes degrade the fractions of the organic waste which are most difficult to degrade, e.g. lignin and cellulose.

A compost cylinder is "started up" by mixing compose material, with an established flora of micro-organisms, with material such as food waste, garden waste, straw, farmyard manure, paper etc., and after a few days the compost has begun to function and the production which shall be composted in the experiment is then placed in a functioning compost milieu where the flora of micro-organisms has had time to settle itself.

During the composting experiments the compost is checked daily with regard to the temperature, consistency and smell. At regular intervals the dry solids content of the compost is determined by drying at 105° C. and weighing of the residue. The temperature development reveals how the biological activity varies, and together with the other parameters a picture of how the composting process proceeds is obtained.

The applied composting principle, i.e. that the compost mass is regularly mixed and airated, implies that a high biological activity is rapidly obtained, and thus thermophilic temperatures. Large parts of the organic material is rapidly degraded and the material is converted to a form which no longer is attractive for different types of noxious animals. This preliminary stage is called initial composting.

The degradation which in these dynamic composts occurs in a relatively short period of time also occurs in static composts (e.g. traditional garden compost), but the degradation takes a considerably longer time.

A common feature for all types of composts is that after this preliminary initial composting a transfer takes place to what is commonly called maturing stage. The maturing stage is characterized by a lower temperature and partially other organism groups dominating the compost. During the maturing stage a slower degradation begins, whereby complex organic compounds are degraded and finally form humus.

Nitrification reactions also occur during this final stage.

Experimental composting of bags according to the invention

| Paper quality | Bags in composting experiment | | |
|---|---|---|---|
| | Grammage ($g/m^2$) | Treatment | Applied amount ($g/m^2$) |
| FD | 70 | PE | approx. 5 |
| Semi-Clupak | 70 | PE | approx. 5 |
| Semi-Clupak | 70 | PE | 6 |

The paper bags were filled with food waste up to a level which corresponds to that which is expected to be normal filling in a household. The bags were then closed in a way which is expected to be used by a consumer, and were placed in the compost containers. Those bags which had broken during the primary use as bags for composting domestic waste, were placed in the compost container with the same amount of food waste around them.

The composting experiment was run for a period of time from Mar. 2, 2993 to Apr. 21, 1993 and from Mar. 5, 1993 the bags were present in the compost cylinders. While the paper bags were composted the compost first underwent an initial composting consisting of a number of thermophilic temperature cycles. The thermophilic temperature was maintained under a period of time by placing new organic material into the compost. When the addition of new material was terminated the temperature declined and the compost proceeded to the final maturing stage.

In addition to food waste also structural material and carbon supplement in the form of straw and teared corrugated fibreboard was added to the compost. Paper of other kind was avoided since this might have made it difficult to identify the paper bags.

The problems which were encountered during the composting experiments were not of unexpected type, and neither was there any reason to directly refere the difficulties to just the presence of the paper bags.

During the composting of the bags the degradation thereof was followed by ocular inspection in connection with the daily checking of the proceeding of the composting process.

Results:

Apr. 21, 1993 the compost cylinders were emptied and the contents were properly searched for traces of the paper bags. It was not possible to find any traces of the bags. Since the degradation of the material which had been placed into the compost cylinders had proceeded relatively far, this was expected.

An additional reason for this may be that the system for decomposing the material which is present in the cylinders is effective, but the actual reason for not finding any traces of the polyethylene coated paper bags is not known. It is reasonable to assume that the polyethylene coating still exists in the examined compost mass despite the fact that it is not visible for the eye. It is however evident that it has been degraded and/or fragmented to such a high degree that it can be considered to have been degraded in the compost.

We claim:

1. Package consisting of paper or paperboard having a single thin, extruded polyethylene coating, wherein the thickness of the polyethlene coating is less than 25 $\mu$m and said package is degradable in a compost.

2. Package according to claim 1, wherein the polyethylene coating is perforated by the fibres of the paper or paperboard.

3. A package according to claim 2, wherein the amount of polyethylene in the coating is approximately 5 g/m² of paper or paperboard.

4. A package according to claim 2, wherein the package is a bag for composting of compostable waste.

5. A package according to claim 3, wherein the package is a bag for composting of compostable waste.

6. Package according to claim 1, wherein the amount of polyethylene in the coating is approximately 5 g/m² of paper or paperboard.

7. A package according to claim 6, wherein the package is a bag for composting of compostable waste.

8. Package according to claim 1, wherein the package is a bag for composting of compostable waste.

9. Method of disposing of a package according to claim 1, wherein the package, with or without compostable contents, is placed in a compost.

10. Method according to claim 9, wherein the compostable waste is domestic waste.

11. Method for storage and transport of compostable waste comprising placing said waste in a package according to claim 1.

12. Package of paper or paperboard having a single thin, extruded polyethylene coating, wherein the thickness of the polyethylene coating is less than 25 μm and the polyethylene coating is perforated by fibres of the paper or paperboard, and said package is degradable in a compost.

13. Package according to claim 12, wherein the amount of polyethylene in the coating is approximately 5 g/m² of paper or paperboard.

* * * * *